United States Patent
Ridgway

(10) Patent No.: US 9,080,900 B2
(45) Date of Patent: Jul. 14, 2015

(54) THREE DIMENSIONAL ORIENTATION AND DIRECTION INDICATOR AND APPARATUS FOR PROVIDING INFORMATION ON A DIRECTION

(76) Inventor: Michael Ridgway, London (GB)

( * ) Notice: Subject to any disclaimer, the term of this patent is extended or adjusted under 35 U.S.C. 154(b) by 329 days.

(21) Appl. No.: 13/138,811

(22) PCT Filed: Apr. 6, 2010

(86) PCT No.: PCT/GB2010/000702
§ 371 (c)(1),
(2), (4) Date: Dec. 29, 2011

(87) PCT Pub. No.: WO2010/112877
PCT Pub. Date: Oct. 7, 2010

(65) Prior Publication Data
US 2012/0139744 A1    Jun. 7, 2012

(30) Foreign Application Priority Data

| Apr. 3, 2009 | (GB) | 0905832.2 |
| Apr. 21, 2009 | (GB) | 0906802.4 |
| Jun. 17, 2009 | (GB) | 0910405.0 |
| Jun. 17, 2009 | (GB) | 0910406.8 |
| Jul. 1, 2009 | (GB) | 0911397.8 |
| Sep. 9, 2009 | (GB) | 0915722.3 |
| Sep. 11, 2009 | (GB) | 0915824.7 |
| Feb. 19, 2010 | (GB) | 1002843.9 |
| Mar. 2, 2010 | (GB) | 1003414.8 |

(51) Int. Cl.
*G08B 5/00* (2006.01)
*G01D 13/22* (2006.01)
*G06F 3/0354* (2013.01)

(52) U.S. Cl.
CPC .......... *G01D 13/22* (2013.01); *G06F 3/03547* (2013.01); *G06F 3/03549* (2013.01)

(58) Field of Classification Search
CPC .......... G08B 5/00; G01C 17/28; G01C 17/00; G06F 15/00
USPC ............... 340/815.4, 974, 971, 979; 701/530; 702/92, 94, 95, 150, 151, 152, 153; 33/356, 300, 361; 345/419, 420
See application file for complete search history.

(56) References Cited

U.S. PATENT DOCUMENTS

| 2,469,403 | A * | 5/1949 | Parker, Jr. ................... 33/330 |
| 3,872,469 | A * | 3/1975 | Loughran, Jr. ........... 340/815.63 |
| 4,513,509 | A * | 4/1985 | Nordstrom ................... 33/330 |
| 7,010,398 | B2 * | 3/2006 | Wilkins et al. ................. 701/3 |

* cited by examiner

Primary Examiner — Toan N Pham

(57) ABSTRACT

A device for indicating a direction or axis in three dimensions to a user, comprises an indicator member (10, 11) configured to indicate a direction in any three dimensional direction,—a static member (12) for mounting the indicator member; and an actuator arrangement (12, 14, 15) configured to urge the indicator member to rotate relative to the static member in any angle about a single point of rotational symmetry. A direction indicating arrangement calculates an angle in three dimensions for indicating a direction and comprises a drive arrangement (13, 14, 15) that drives a pointing device (10, 11) to point in the calculated direction. An apparatus for providing information on a location in a direction comprises a pointing device comprising a mount and a direction indicator moveable by a user to point in a direction in three dimensions; a detection arrangement for detecting the orientation of the direction indicator; a processor programmed to determine the direction using the detected orientation; and a display for displaying information on the direction.

28 Claims, 26 Drawing Sheets

Fig 16
Fig 17
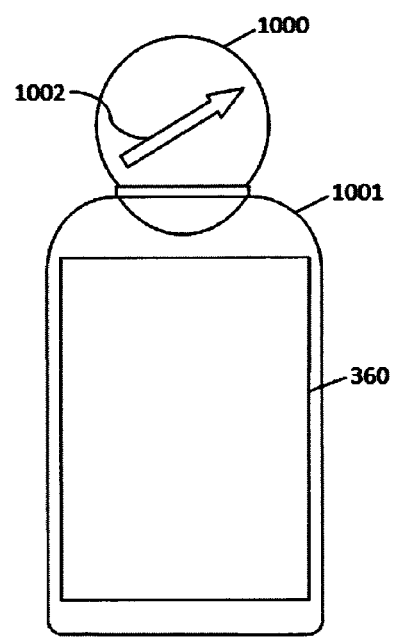
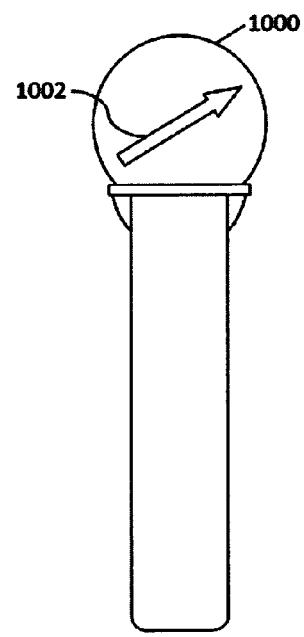

THREE DIMENSIONAL ORIENTATION AND DIRECTION INDICATOR AND APPARATUS FOR PROVIDING INFORMATION ON A DIRECTION

This invention relates to a three dimensional orientation and direction indicator and apparatus for providing information on a selected direction.

We live in a three dimensional world and universe and with advancing technology computers are becoming increasingly more precise in knowing their orientation and position in three dimensional space and of the three dimensional location of people, objects and places everywhere.

Improved access to information held by computers is always good and this of course includes three dimensional orientation and position information.

Access to information on most subjects is easily provided by a 2D LCD screen that will provide a clear visual display that can be seen from different viewing angles and distances and by more than one person simultaneously.

However a 2D screen of a mobile computer device can't display a true three dimensional image and this limits the device in how it can indicate its orientation in three dimensions since a three dimensional representation will have greater correspondence with a three dimensional orientation than a two dimensional representation. This represents a constraint on the computer in providing access to information it contains on its orientation and position in three dimensions.

For example, a 2D screen can't display a three dimensional horizontal or vertical baseline that could be used to visually compare the angle of tilt of a computer device in three dimensions against a true horizontal or vertical reference, and it can't display a three dimensional pointer to indicate a three dimensional position in space from the position of the device.

A phone or tablet can indicate a three dimensional direction with the help of the user in moving the device to find the correct direction but can't auto-display a three dimensional direction with a 2D screen.

A picture in perspective of a pointer could be presented on the screen but this would only be accurate from a restricted viewing angle. For example, a pointer indicating a direction that passes over your right shoulder will continue to appear to do that with changes of viewing angle of the screen.

An autostereoscopic screen using a lenticular lens or parallax barrier system could be proposed but these have limited viewing angles before the image distorts, predominantly only work for horizontal changes of viewing angle and eye tracking stereoscopic systems limit the display to a single viewer. These limitations can make an autostereoscopic screen less than ideal where a three dimensional indication of an orientation or direction is required for casual viewing from any angle.

An object of the present invention is to provide a useful means by which a computer device can display a true three dimensional representation of its orientation and direction that is accurate from all viewing angles and distances, can be simultaneously viewed by more than one person and is visually accessible up to 360° around the device.

The invention can be adapted for use in different environments and situations and in connection with different types of device (either as part of a device or as an accessory) where a hands free and viewer position free three dimensional display of an orientation or direction is helpful to users.

Applications of the invention include home use with a computer, as a three dimensional navigation aid, as a three dimensional directional sign, as an accessory to a Sat Nav device, as an underwater orientation and direction indicator for use with submersibles and for divers and as a three dimensional attitude indicator.

One aspect of the present invention provides a device for indicating a direction or axis in three dimensions to a user, the device comprising an indicator member configured to indicate to the user a direction in or axis along any three dimensional direction; a static member for mounting the indicator member; and an actuator arrangement configured to urge the indicator member to rotate relative to the static member in any angle in three dimensions about a single point of rotational symmetry, wherein the axis or direction passes through the single point.

In one embodiment the indicator member comprises a substantially transparent sphere having a linear indicator fixed therein extending through the single point, and the actuator arrangement is configured to interact with the surface of the sphere to rotate the sphere relative to the static member.

In one embodiment the indicator member comprises an indicator arm extending through the single point, the static member comprises a sphere for containing the indicator arm so that the indicator arm is constrained to rotate about the single point located at the centre of the sphere, and the actuator arrangement is configured to urge the indicator arm to rotate about the single point.

The actuator arrangement can be configured to generate an electromagnetic field, and the indicator member can be configured to respond to changes in the electromagnetic field to rotate.

In one embodiment the indicator member includes a magnetic arrangement for interaction with the electromagnetic field.

One embodiment includes a position sensor arrangement for sensing the relative position of the indicator member and the static member, and the actuator arrangement is configured to be responsive to the sensed relative position.

In one embodiment the actuator arrangement comprises a mechanical drive arrangement for engaging with and urging the indicator member to rotate.

One embodiment includes an attitude determination unit configured to determine the attitude of the static member and to control the actuator arrangement to cause the indicator member to act as an attitude indicator.

Another aspect of the invention provides a direction indicating arrangement comprising a processor programmed to calculate an angle in three dimensions for indicating a direction in three dimensions; a pointing device for pointing in the direction; and a drive arrangement for driving the pointing device in response to the calculated angle to point in the direction.

In one embodiment the processor is programmed to use information on a target location and to calculate the angle based on the information on the target location and information on the current location of the pointing device.

One embodiment includes a location determining arrangement for determining the current location of the pointing device in three dimensions.

In one embodiment the pointing device is static and the processor is programmed to use a known current location.

One embodiment includes a user interface configured to allow a user to input target location information, and the processor is programmed to respond to the input.

In one embodiment the user interface is configured to allow a user to input the target location information or select a location from a list of locations, and the processor is programmed to calculate the target location information if the user selects a location.

One embodiment includes an orientation determining arrangement configured to determine the orientation of the pointing device in three dimensions, wherein the processor is programmed to calculate the angle using the determined orientation.

In one embodiment the processor is programmed to calculate the angle based on an assumed orientation of the pointing device.

In one embodiment the pointing device of the direction indicating arrangement comprises the device as defined above.

Another aspect of the present invention provides apparatus for providing information on a location in a direction, the apparatus comprising a pointing device comprising a mount and a direction indicator moveable by a user relative to the mount to point in a direction in three dimensions; a detection arrangement for detecting the orientation of the direction indicator in three dimensions relative to the mount; a processor programmed to determine the direction and information on the direction using the detected orientation; and a display for displaying information on the direction.

In one embodiment the processor is programmed to use information on the current location of the pointing device to determine the direction.

One embodiment includes a location determining arrangement for determining the current location of the pointing device in three dimensions, and the processor is programmed to use the determined current location in the determination of the direction.

In one embodiment the pointing device is static and the processor is programmed to use a known current location.

One embodiment includes a user interface configured to allow a user to select information for display on the direction.

One embodiment includes an orientation determining arrangement configured to determine the orientation of the pointing device in three dimensions, wherein the processor is programmed to use the determined orientation in the determination of the direction.

In one embodiment the processor is programmed to calculate the direction using an assumed orientation of the pointing device.

In one embodiment the pointing device of the apparatus comprises the device as defined above One embodiment of the present invention provides a means whereby three dimensional data on directions from the indicator and/or orientation in space of the indicator can be represented three dimensionally.

In one aspect the invention provides an arrow or other shape or marking that can be turned in any direction up to a solid 360°.

The arrow or other shape or shapes may be contained within a transparent sphere and may be controlled to point in different directions or show different orientations with the use of a computer program that has access to Global Positioning System (GPS) and/or other relevant data on the position of the unit.

Some embodiments of the invention provide a three dimensional orientation or direction indicator for the following purposes:—

As part of a Satellite Navigation system for a road vehicle or sea vessel to point in the direction of the destination of any particular journey.

As an accessory to a PC to show the direction of places accessed on the Internet.

As part of a sign to show the direction of shops, amenities and other places in public areas.

As a three dimensional attitude indicator.

As a unit in submersibles to show the orientation of the vessel under the water.

As a unit to be worn or carried by divers to provide information on their orientation and/or the direction of the support vessel.

As part of a handheld GPS navigation unit.

As part of a portable star and planet finder to point in the direction of stars and planets.

As part of a metal detector to show the direction of concealed metal objects.

As a way of controlling an arrow or other pointer with the use of coils round a sphere.

A description of embodiments of the invention will now be made with reference to the following drawings in which:

FIGS. 16 and 17 are diagrams of a unit in accordance with a further embodiment;

Figure 20:
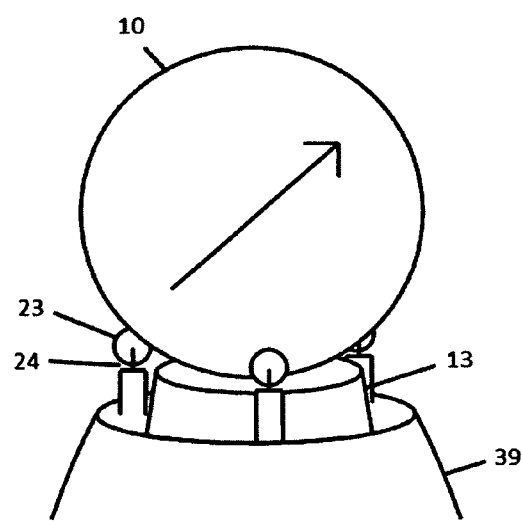
Figure 21:
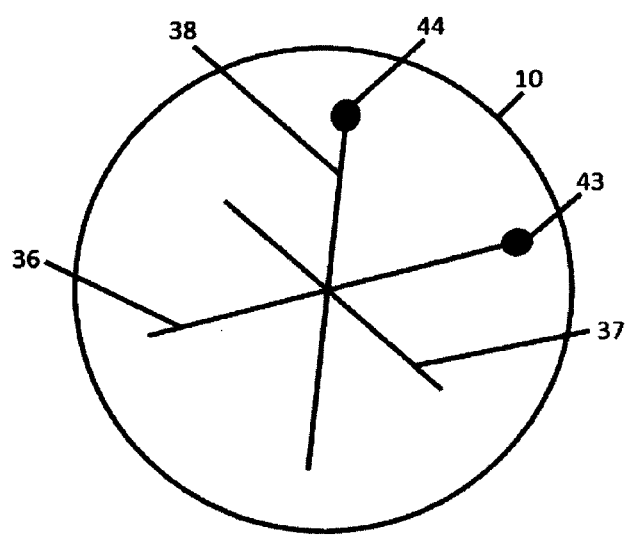
Figure 22:
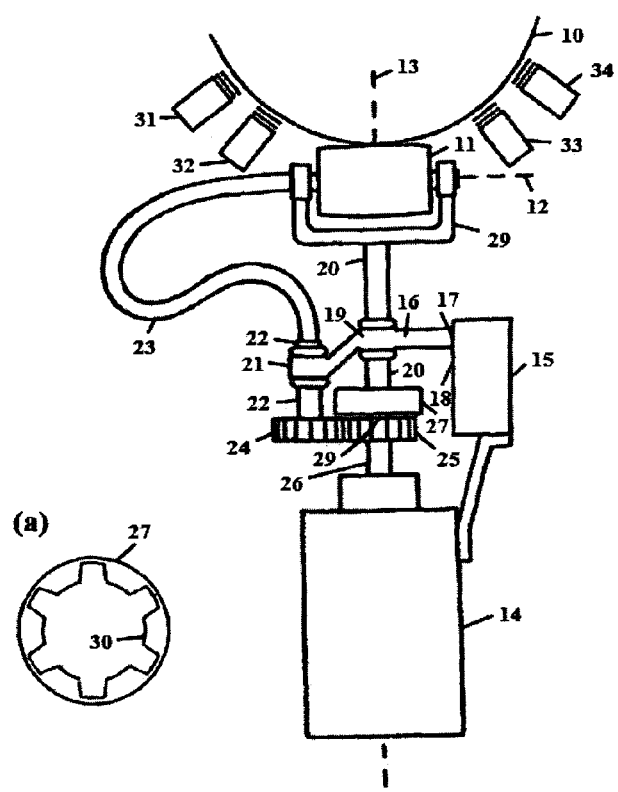
Figure 23:
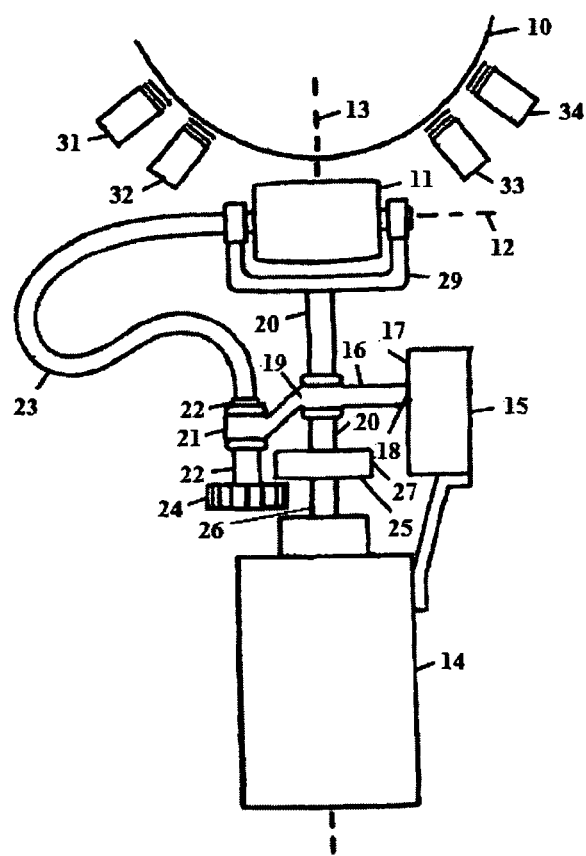
Figure 24:
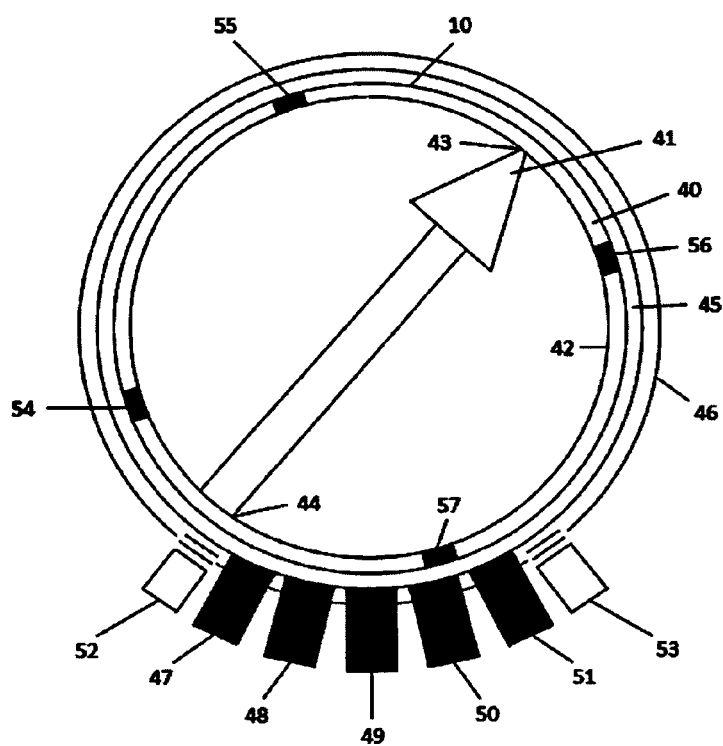
Figure 25:
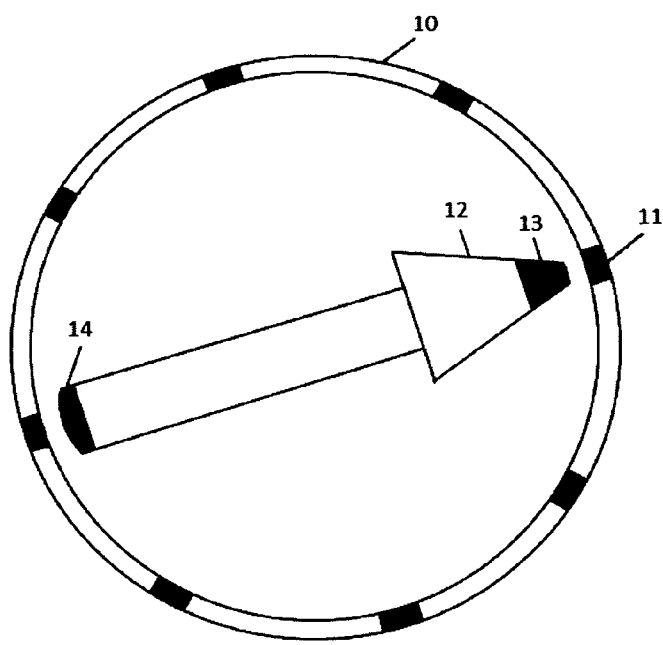
Figure 26:
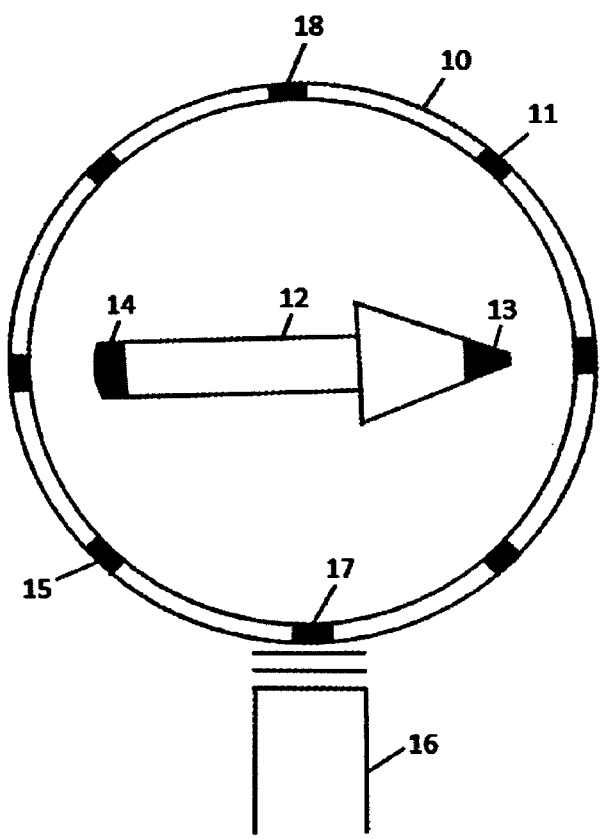
Figure 27:
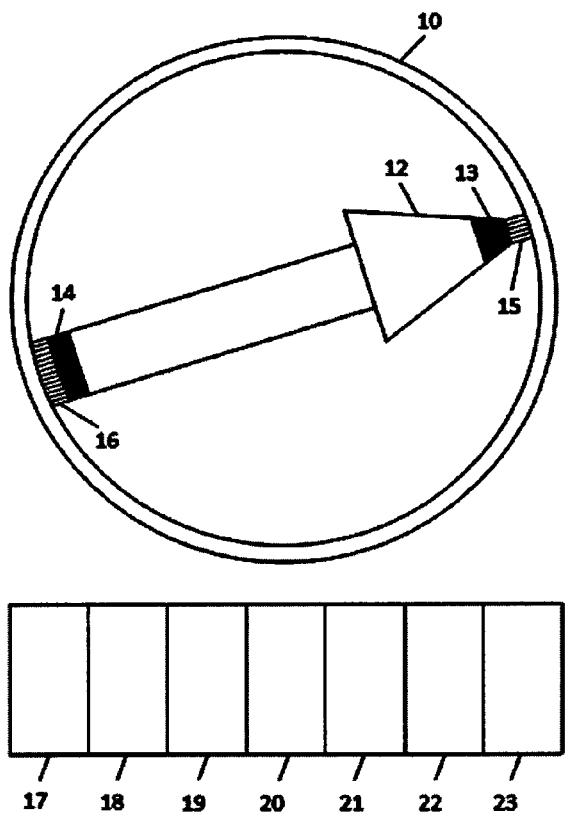

FIGS. 19(a) and (b) illustrate an actuator arrangement for moving the ball in accordance with one embodiment;

FIG. 20 illustrates an actuator arrangement for moving the ball in accordance with another embodiment;

FIG. 21 illustrates a perspective view of a ball with interior lines extending across the ball at 90°;

FIGS. 22 and 23 illustrate an actuator arrangement for moving the ball in accordance with a further embodiment;

FIG. 24 illustrates an actuator arrangement for moving the ball in accordance with another embodiment;

FIG. 25 illustrates an actuator arrangement for moving the arrow in accordance with one embodiment;

FIG. 26 illustrates an actuator arrangement for moving the arrow in accordance with another embodiment; and FIG. 27 illustrates an actuator arrangement for moving the arrow in accordance with a further embodiment.

Figure 1:
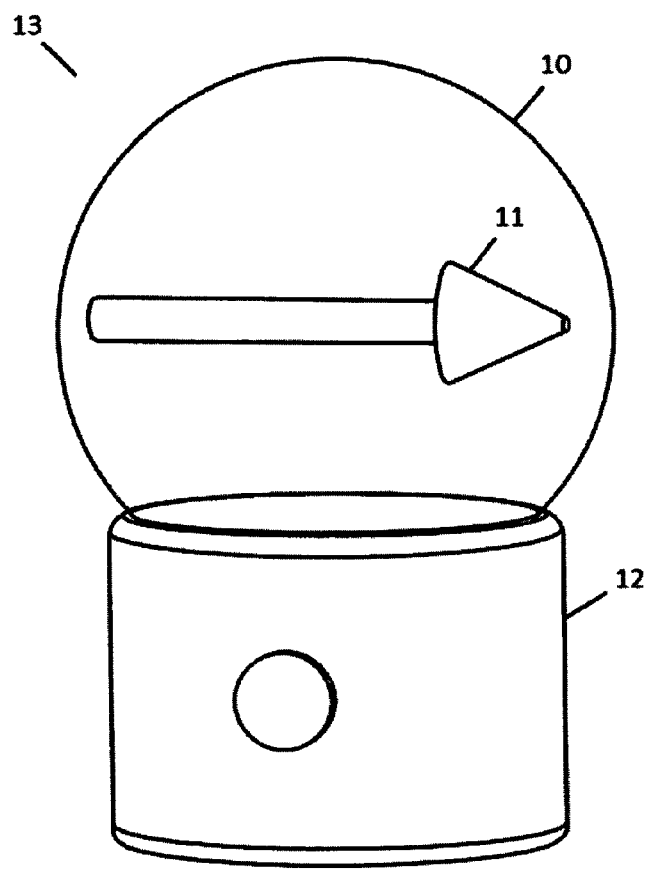
FIG. 1 is a diagram of a three dimensional direction indicator unit in accordance with one embodiment.

FIG. 1 shows an embodiment of a three dimensional direction indicator in the form of unit 13 containing sphere 10, arrow 11 and base unit 12.

Unit 13 may be connected to a PC or laptop with a USB cable and it shows the direction of places accessed on the interne. The computer contains a program to control the unit and knows its compass orientation either from this information being programmed manually into the computer by the user who has established the direction of the unit or automatically from a reading of a compass contained within the unit.

The computer also knows the geospatial location of the unit, either from it having been programmed manually into the computer by the user (i.e. by providing the Post Code of the place of the unit) or automatically from a Global Navigation Satellite System (GNSS) detection system which could be for example contained within the laptop.

The arrow 11 is caused to turn to point in any required direction in a solid 360°. The user accesses a place on the internet and the computer program then operates a drive in base of the unit 12 that causes arrow 11 to point in the true direction from the unit of the accessed place. The arrow 11 is able to rotate freely through any angle, which can be greater than one rotation in any direction about a pivot point or axis lying at the centre of the sphere 10.

The unit can be disconnected from the PC or laptop and connected to a windscreen mount in the car. There is a cable that goes from the unit to the Sat Nav device. The computer within the Sat Nav causes the arrow 11 to point in the direction of the journey destination or any other selected direction as a three dimensional visual reference for the driver.

The sphere 10 may contain a touch-screen capability whereby the user can move the arrow with his finger which simultaneously changes the view on the Sat Nav screen to conform to the direction of the arrow 11. In such an arrangement, the surface of the sphere has a touch screen mechanism to allow a user to select any direction in 3D. Conversely the user can use the touch-screen capability of the Sat Nav screen to simultaneously change the view on the screen and move in the arrow 11 to point in the direction of that view. This arrangement thus provides for the user a view on the screen for any selected direction of the arrow 11 and an arrow direction for any selected view on the screen.

Figure 2:
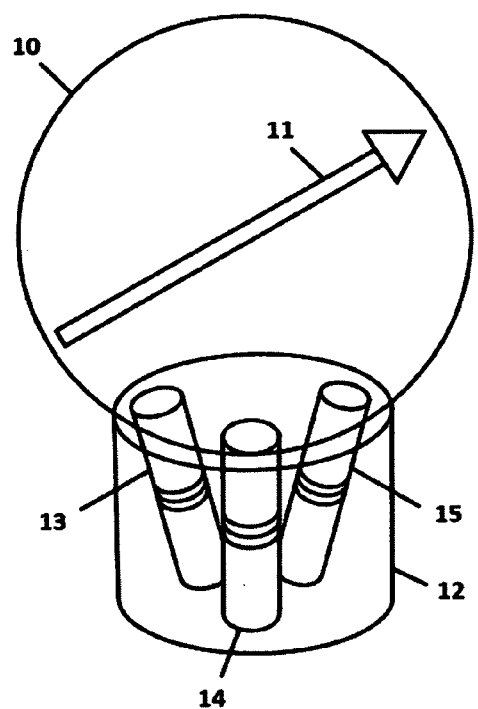
FIG. 2 is a diagram illustrating one arrangement for moving the arrow in a three dimensional direction indicator unit.

FIG. 2 illustrates one method of moving the arrow 11 in a three dimensional direction indicator unit. The unit consists of transparent sphere 10, bar magnet arrow 11 and base unit 12 containing three electromagnets 13, 14 and 15 set at angles. The arrow may be contained in a fixed position in an inner sphere (not illustrated) that moves freely within the outer sphere 10 or the arrow 11 may freely move in sphere 10 with no inner sphere. Electromagnets 13, 14 and 15 cause the arrow to move in different directions through the adjustment of the electromagnetic strength of each magnet. The arrow 11 as a bar magnet thus responds to the changing position of lines of magnetic flux due to the pattern of varying strength of current being applied to the electromagnets with the result that the arrow can be controlled accordingly. Different arrangements of magnets can be employed to move the arrow.

Figure 3:
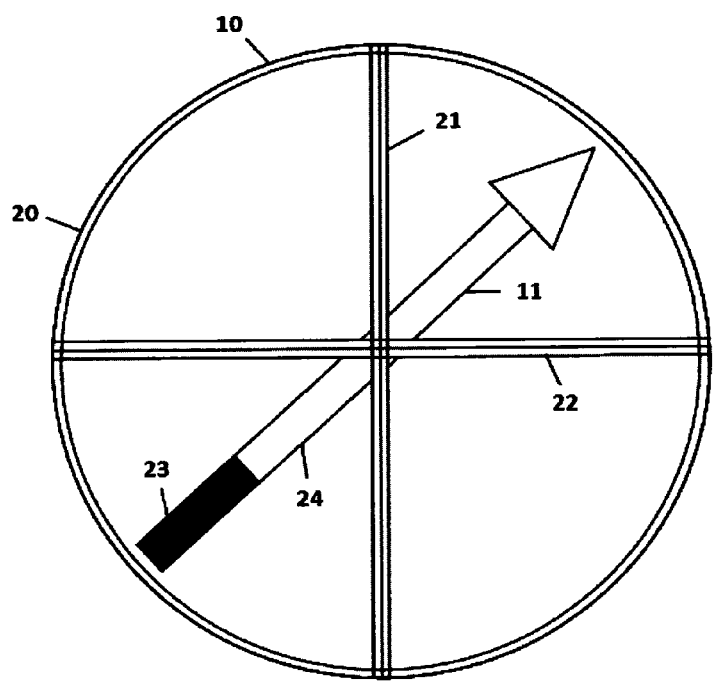
FIG. 3 is a diagram of a three dimensional direction indicator unit in accordance with another embodiment.

FIG. 3 shows another configuration that will move the arrow as required in which the arrow comprises a non-magnetic but magnetically attractable metal section 23 at one end with the remainder consisting of a non-metallic material such as plastic 24. The metal section 23 is perfectly counterbalanced by the remainder 24 of the arrow 11 with the result that the weight of the arrow is equal at both ends. There are three coils around the circumference of the sphere 20, 21 and 22.

The coils are positioned within different layers of the substrate of the sphere 10 and therefore do not touch one another. Each coil is provided with a separate electric current which is individually adjustable. The changing mixture of field strengths from the coils changes the position of the arrow as metal section 23 moves in the direction of the changes of lines of magnetic flux within the sphere. In this way the arrow is caused to point in any required direction.

An advantage of this arrangement is that the unit can easily include a magnetometer for use as a compass reference which may otherwise be affected by a magnetic arrow. The current to the coils and magnetometer can alternate so that the magnetometer is not affected by magnetism from the coils.

Rather than containing the coils within narrow bands around the sphere (as illustrated) they may extend to the full diameter of the sphere 10.

Figure 4:
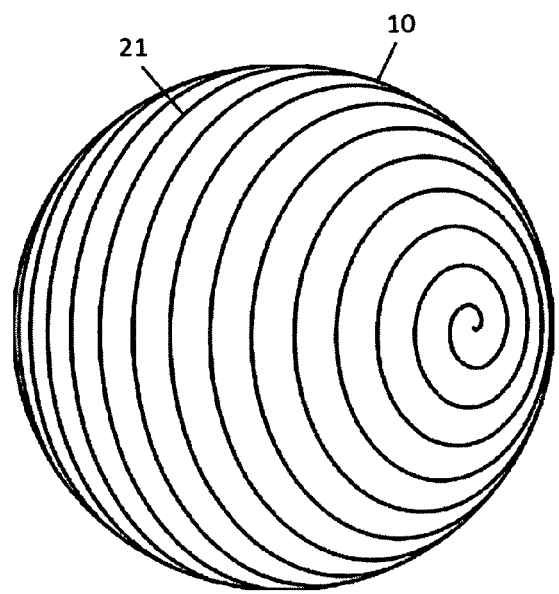
FIG. 4 shows an example of one of the expanded coils referred to in FIG. 3, extending to the full diameter of the sphere.

FIG. 4 shows an example of one of the expanded coils 21 referred to in FIG. 3, extending to the full diameter of the sphere 10.

Figure 5:
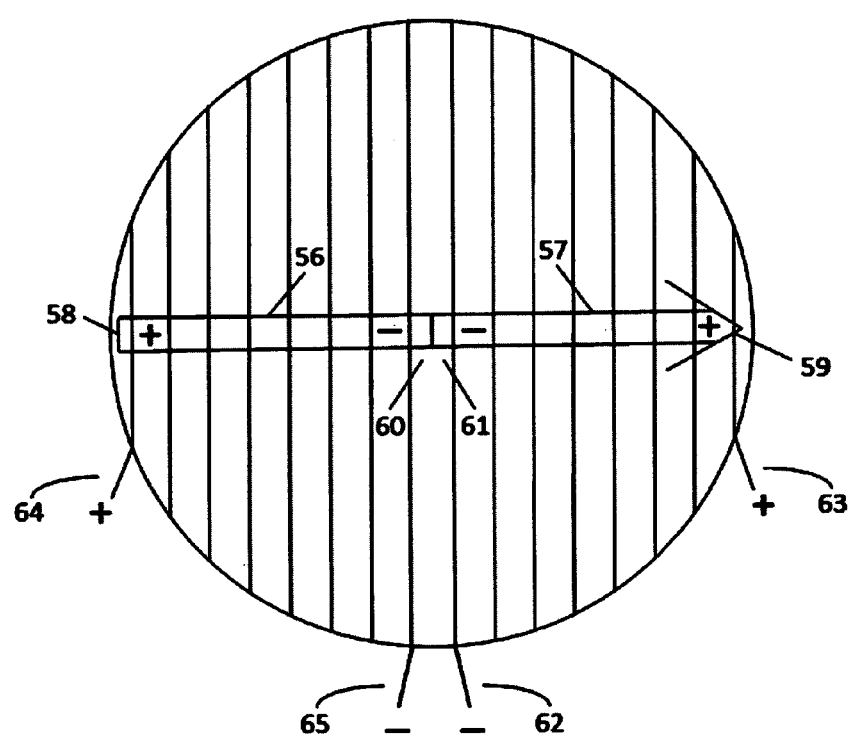
FIG. 5 illustrates arrangement in which the arrow comprises two bar magnets.

FIG. 5 shows an arrangement in which the arrow 11 comprises two bar magnets pointing in opposite directions 56 and 57 so that for example the north pole of each magnet 58 and 59 is pointing outward and the south pole of each magnet 60 and 61 is meeting at the centre of the arrow. Because each magnet is pointing in the opposite direction, each one is cancelling out the other's tendency to be affected by the earth's magnetic field and by other external sources of magnetism.

The coils may be arranged in three directions (only one is shown in this illustration) as in FIG. 3 but each coil direction is divided into two separate coil sections with the north pole of each coil section pointing in the opposite direction to the other. Thus, electric current running from 60 to 61 runs in the same direction as magnetic direction of arrow section 60 to 58 and electric current running from 62 to 63 runs in the same direction as magnetic direction of arrow section 61 to 59. The same applies to all three coil directions. In this way the arrow can be turned in any direction by varying the mixture of electric current to the three coil directions around the sphere. A highly accurate arrow position sensor may not be necessary because the arrow linesup with predictable lines of magnetic flux from the coils but the system may need to periodically check which way around the arrow is as both ends of the arrow respond equally to the flux lines from the coils. Therefore a sensor that simply checks which way round the arrow is may be required. This could be an optical sensor that detects ultraviolet paint on one end of the arrow.

Figure 6:
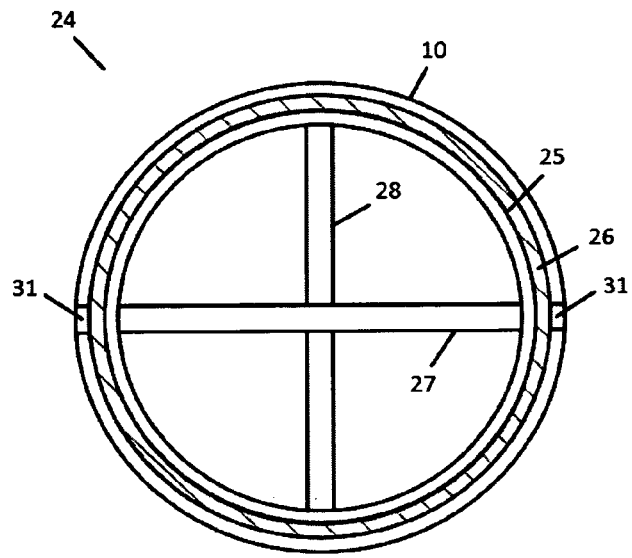
FIGS. 6 and 7 illustrate a three dimensional attitude indicator in accordance with one embodiment.
Figure 6:
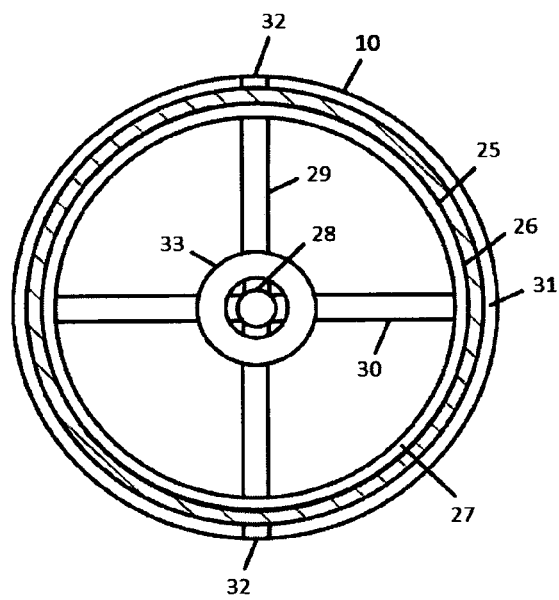
Figure 7:
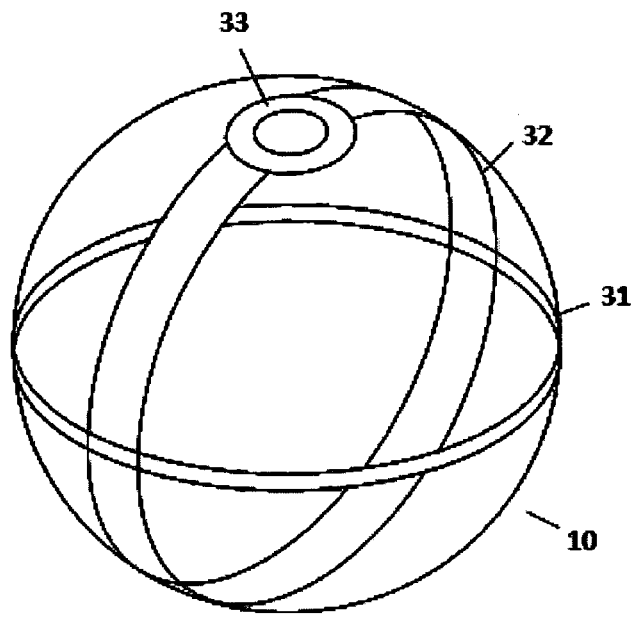
Figure 7:
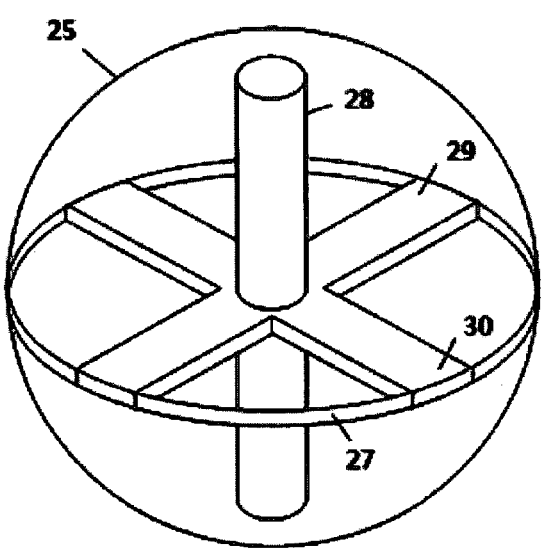

FIG. 6 and FIG. 7 show an example of the invention as a three dimensional attitude indicator for an aircraft or that could also be used as an orientation indicator in other types of vehicle or craft that move in three dimensional space.

The three dimensional attitude indicator 24 is positioned on the instrument panel of the aircraft or in another convenient place.

Hollow inner sphere 25 is suspended within the outer sphere 10. Between the two spheres 10 and 25 is a narrow space 26 containing a lubricating fluid, spacers or rollers to allow the inner sphere 25 to move freely within outer sphere 10. Contained in a fixed position within the inner sphere 25 is band 27, vertical line marker 28 and horizontal line markers 29 and 30. The outer sphere 10, contains horizontal band marking 31, vertical band marking 32 and ring marking 33.

The inner sphere 25 is turned with the use of a stepper motor or by other means to maintain the true horizon and flight path. The outer sphere 10 is in a fixed position in relation to the aircraft. When the aircraft changes orientation to the horizontal with pitch and roll or with changing degrees of Yaw, the lines 27, 28, 29, 30 within the inner sphere 25 change their alignment to the lines 31, 32 and 33 on the outer sphere 10 and the degree of change of alignment shows the degree of departure form horizontal in any direction and Yaw divergence from line of travel.

Thus when 29 in inner sphere 25 is to the side of line 32 on the outer sphere 10 there is a Yaw divergence from the line of travel (line of travel being indicated by line 29). When band 27 is above or below band 31 there is a divergence from the horizontal (horizontal being indicated by band 27).

Divergence from horizontal is also indicated by top of line 28 (that indicates vertical) in relation to circle 33. When top of line 28 is at the centre of ring 33 the aircraft is horizontal in all directions and when there is a difference between top of line 28 and the centre of ring 33 there is a divergence from horizontal.

Other shapes or markings may be used for the above purposes.

Apart from the intuitive three dimensional advantage of this invention over the two dimensional attitude indicator, the system is capable of providing a correct representation of any angle of tilt of the aircraft in any direction—as in the case of performing aerobatics for example—which is not achievable with a two dimensional attitude indicator.

Figure 8:
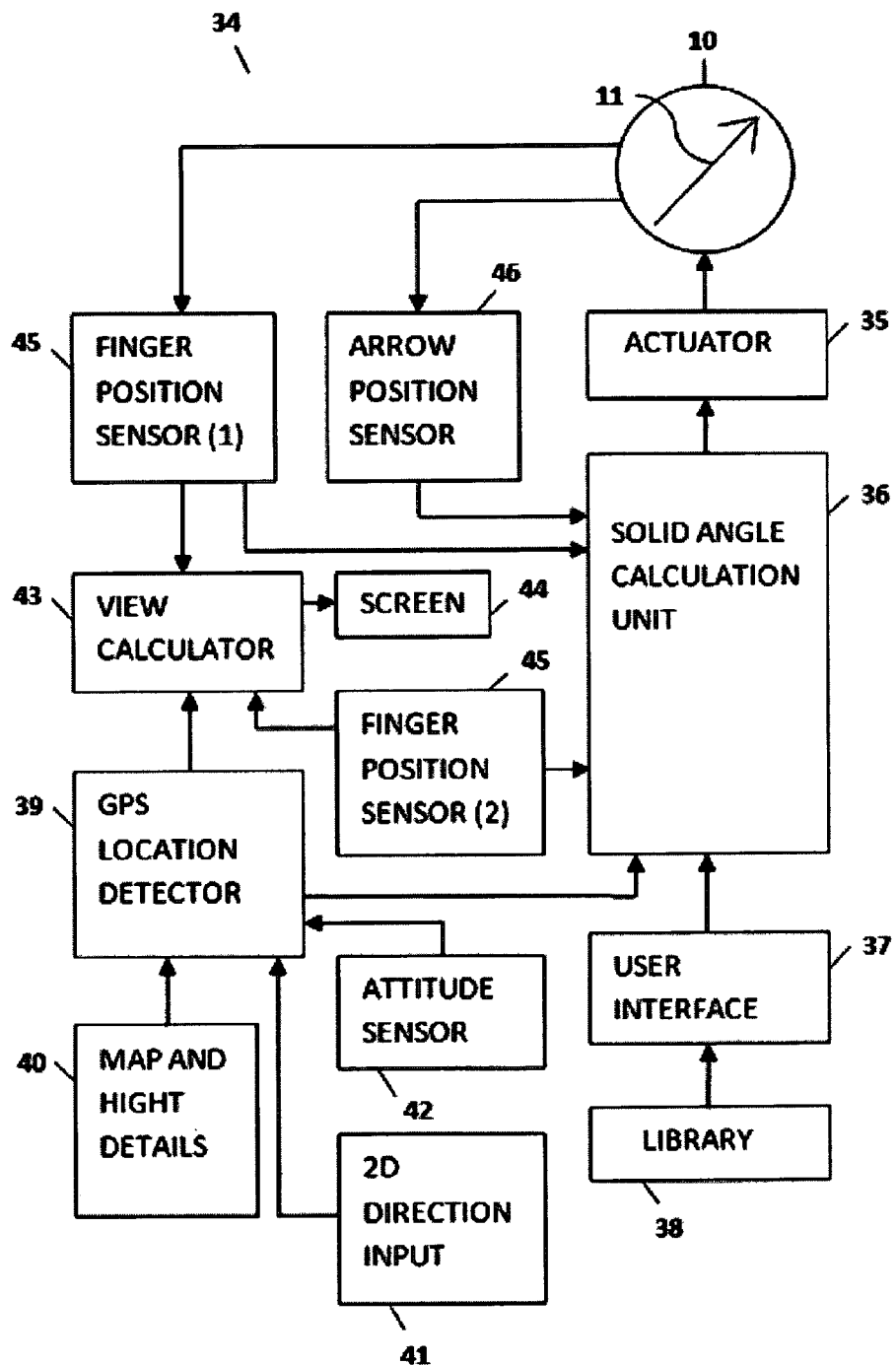
FIG. 8 is a schematic representation 34 of a three dimensional direction indicator used as an accessory to a Sat Nav device or as part of a Sat Nav system in accordance with one embodiment.

FIG. 8 shows a schematic representation 34 of a number of components incorporated to operate the invention as a three dimensional direction indicator used as an accessory to a Sat Nav device or as part of a Sat Nav system. This representation can also illustrate the system when used with a PC or laptop and as a portable handheld device.

With reference to its use in a Sat Nav system, arrow 11 in sphere 10 is caused to move to show the direction of the destination of the journey or other directions through the operation of the actuator 35 in response to the solid angle calculation unit 36 which calculates the position of arrow 11 with inputs from user interface 37 that derives the selection for the direction of the arrow 11 from library 38 and further inputs to the solid angle calculation unit 36 come from GPS location detector 39 that derives its information from map and height details 40, 2-D directions input 41 and attitude sensor 42. The GPS location detector 39 both supplies the solid angle calculation unit 36 and the view calculator 43 that calculates view for screen 44.

The user has the option of finding a view on screen 44 that corresponds with the direction of the arrow 11 by controlling the direction of the arrow 11 with his finger. He does this by touching the sphere 10 and moving his finger around it. The sphere has a touch-screen facility and the position of the user's finger is detected by finger position sensor 45 (1) that both supplies the solid angle calculation unit 36 so that the arrow turns in accordance with moving finger on sphere 10 and the view calculator 43 that enables a corresponding image to appear on screen 44 that matches the direction of arrow 11.

Conversely, the user can also cause the arrow 11 to point in the direction of views on screen 44 with the touch-screen facility of the screen. The user causes the direction of the view on the screen 44 to progressively pan around the car by pushing the image on the screen to the side with his finger. This is achieved through the touch screen finger sensor (2) 45 providing the appropriate view on screen 44 through the view calculator 43 and the appropriate angle of the arrow 11 through the solid angle calculation unit 36.

If the arrow 11 is caused to move in a way in which its position can be predicted, it may not be necessary to incorporate an arrow position sensor 46 however this may be incorporated with some systems where this is necessary or where an arrow position sensor improves accuracy.

The arrow position sensor 46 gauges the position of the arrow 11 and feeds this information into the solid angle calculation unit 36 that responds by adjusting the arrow 11 as required.

This schematic representation will now be used to illustrate how the invention can be used in relation to a PC or laptop and a portable hand held unit.

The position of the unit is established either through user interface 27 or GPS location detector 39. The solid angle calculation unit 36 then controls the actuator 35 to point the arrow in the required direction. Any other component in this illustration may also apply. The handheld unit may for example be used for navigation purposes or to find stars and planets in the night sky.

Figure 9:
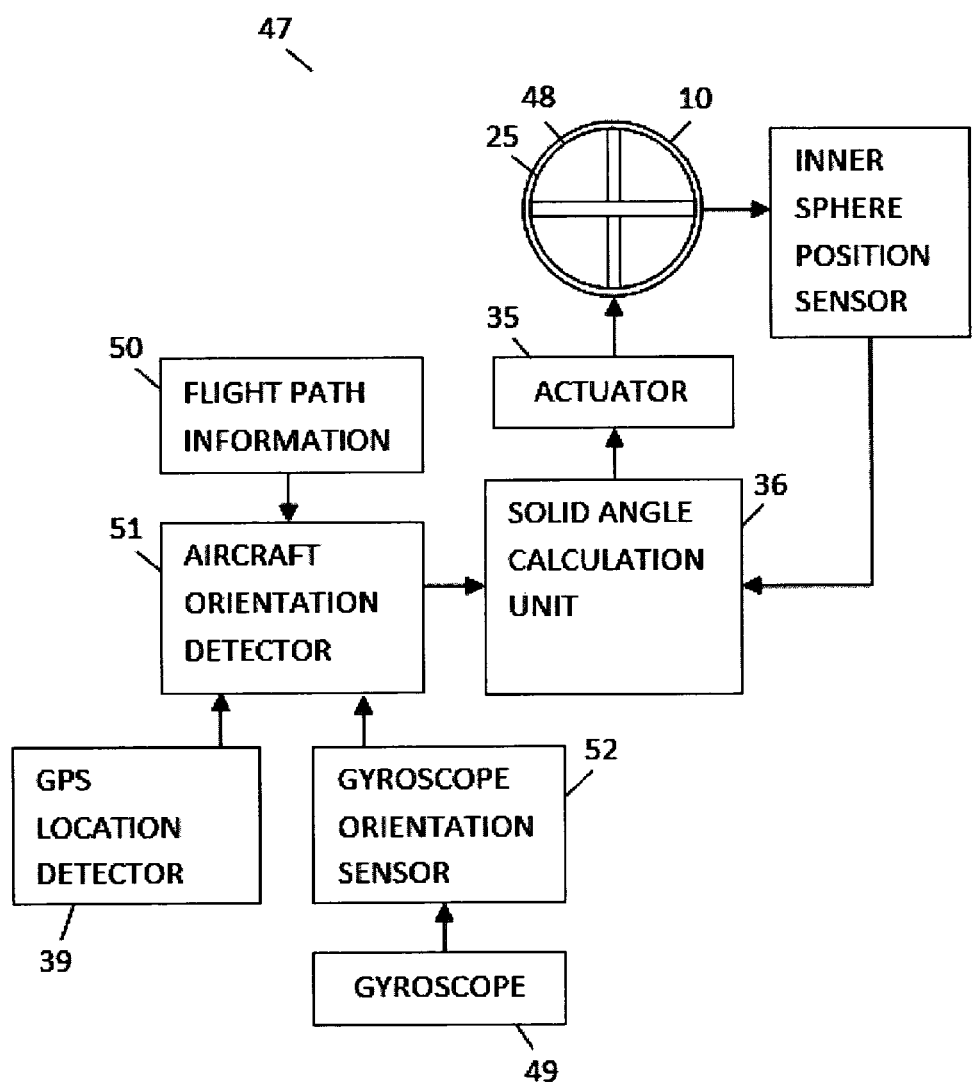
FIG. 9 is a schematic representation of a three dimensional attitude in accordance with one embodiment.

FIG. 9 shows a schematic representation of a three dimensional attitude indicator 47.

The visible part of the attitude indicator 48 consists of an inner sphere 25 and an outer sphere 10. The inner sphere 25 moves within the outer sphere 10 that is in a fixed position in relation to the aircraft. The inner sphere 25 is caused to move by the actuator 50 that may involve one or more stepper motors in contact with the inner sphere.

The three dimensional attitude indicator sources the same data for its orientation as a traditional 2-D attitude indicator as it is providing the same information in a three dimensional form, namely the pitch, roll and yaw of the aircraft.

Data on the position and orientation of the aircraft is supplied from GPS location detector 39, flight path information 50, gyroscope 49 and gyroscope orientation sensor 52 which supplies aircraft orientation detector 51 that in turn supplies the solid angle calculation unit 36 which causes actuator 35 to move the inner sphere 25 accordingly.

Figure 10:
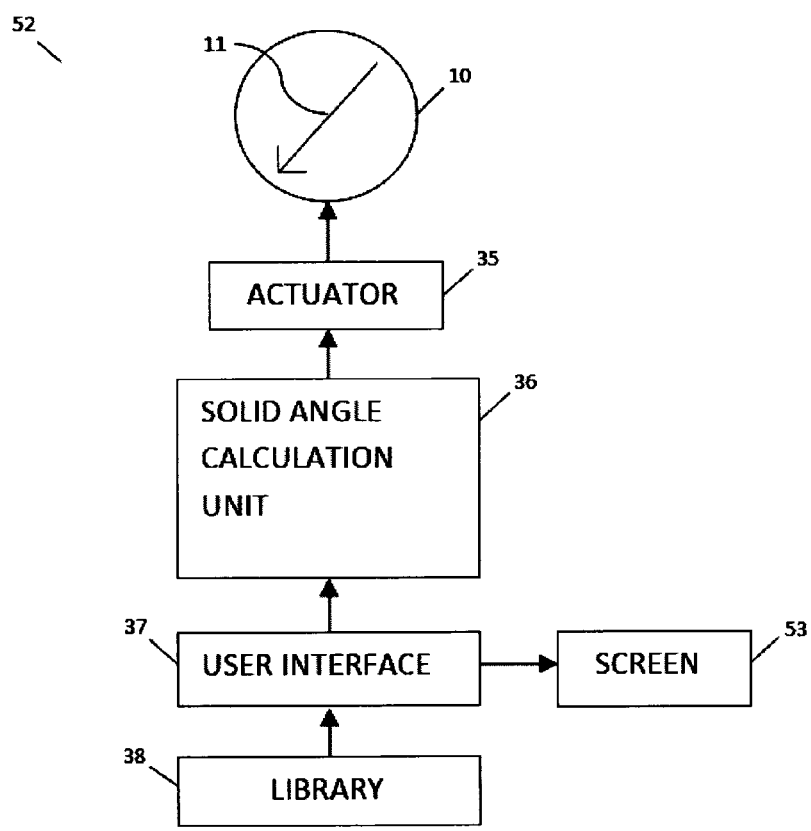
FIG. 10 is a schematic representation of a three dimensional sign that may be used in public places in one embodiment.

FIG. 10 shows a schematic representation of a three dimensional sign 52 that may be used in public places.

The user controls the sign through user interface 37, programming the arrow 11 to point in required directions in a sequence and providing a display on screen 53 that matches the direction of the arrow 11. This could be for example the name of a shop to which the arrow 11 is programmed to point. The user may select from a library 38 of places that the arrow 11 is required to point and can reprogram the sign when required. From the library of locations or directions the solid angle calculator 36 calculates a drive signal or angle to control the actuator 35 to drive the arrow 11 to point in the required direction based on the assumption that the location and orientation of the unit is known.

This embodiment of the invention could also be used to indicate any direction required by a user which can include the direction of rotation of the earth, the location of the sun, planets, satellites, stars, galaxies or any other astronomical object, a location on the earth's surface or even below the surface.

Figure 11:
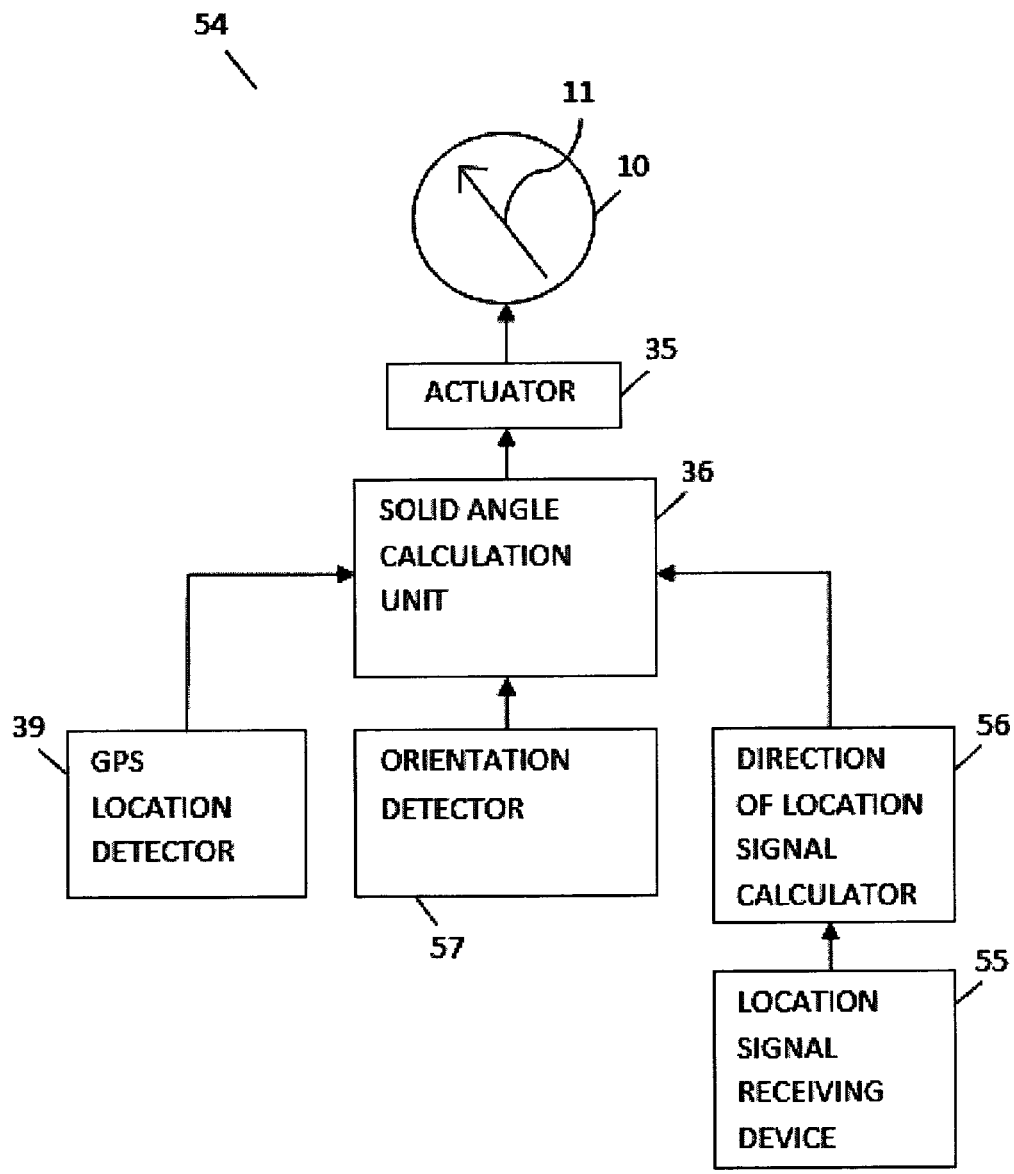
FIG. 11 is a schematic representation of a unit to be worn or carried by divers to provide information on their orientation and/or the direction of the support vessel in accordance with one embodiment.

FIG. 11 shows a schematic representation of a unit 54 to be worn or carried by divers to provide information on their orientation and/or the direction of the support vessel.

The arrow 11 in sphere 10 can show the direction of the support vessel while they swim around. The device 54 may detect a signal such as sonar or a radio signal from the support vessel with location signal receiving device 55 and the direction of the signal is calculated by the direction of location signal calculator 56. The unit may also have input from a GPS location detector 39 and orientation detector 57 which supplies solid angle calculation unit 36 that enables arrow to point in the direction of the support vessel.

Figure 12:
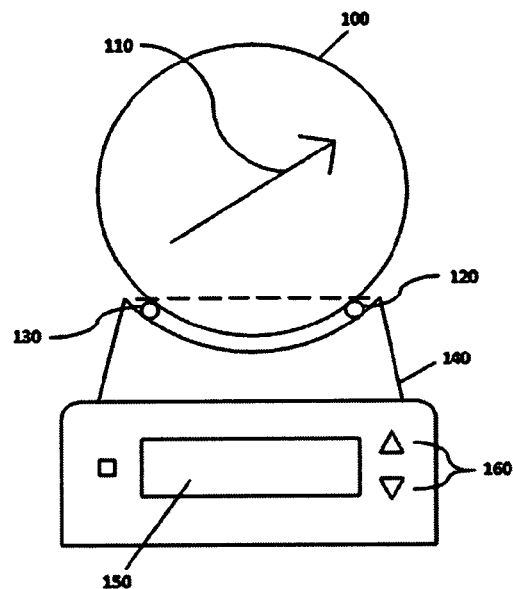
FIG. 12 is a diagram of a unit in accordance with one embodiment.

FIG. 12 illustrates another embodiment in which a transparent ball 100 contains an arrow 110 that extends through the centre of the ball 100 in a fixed relationship. The ball 100 rests on a support unit 140 that allows it to rotate in any direction by the use of a drive arrangement 120 comprising driven wheels. The mechanics of the drive arrangement 120 can be visible or hidden in a concave area 130 of the support unit 140. The support unit contains an LCD display 150 that displays a user interface to allow a user to control the unit. Buttons 160 can be used by the user to make selections. Thus this unit can be used in any of the configurations of FIG. 8, 9 or 10.

Figure 13:
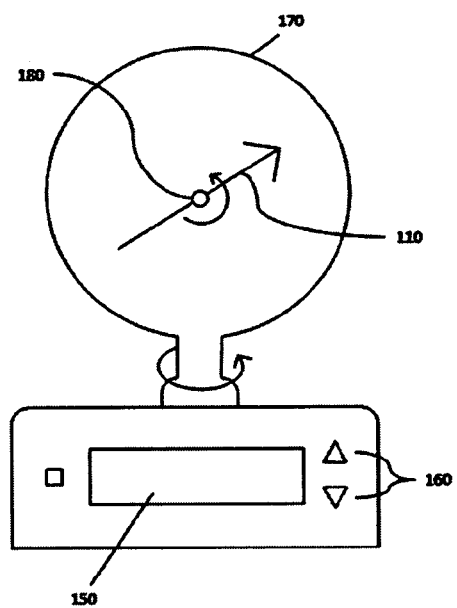
FIG. 13 is a diagram of a unit in accordance with another embodiment.

FIG. 13 illustrates another embodiment in which an arrow 110 is mounted on a transparent disk 170 to allow it to rotate in a plane through 360°. The disk 170 is mounted on an axle 190 which is can be rotated through 360° about an axis in the plane of the disk 170. Hence the arrow 170 can be moved in any direction in 3D. The support unit 140 is similar to the previously described embodiment and has an LCD display 150 and buttons 160.

Figure 14:
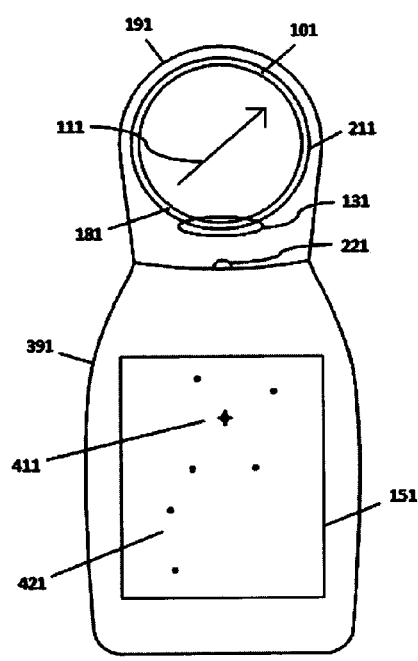
FIG. 14 is a diagram of a unit in accordance with a further embodiment.
Figure 14:
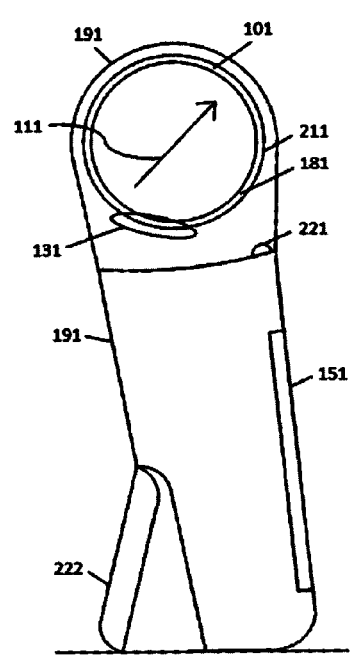

FIG. 14 illustrates a portable unit 391 in accordance with one embodiment of the invention in which 14(*a*) is a front view and 14(*b*) is a side view.

A transparent ball 101 contains an arrow 111 that is in a fixed position relative to the ball 101. The ball may be hollow to reduce the optical distortion of the arrow and therefore the arrow may be connected to either side of the interior of the ball 101. In this embodiment the ball 101 is suspended in a rotatable fashion in the inner face 211 of a transparent casement 191. An LED light 221 can illuminate the ball 101 in low ambient light. The suspension arrangement 181 can comprise any means that allows the ball 101 to rotate eg the ball 101 can be completely encased by the transparent casement 191 and the suspension arrangement can comprise a liquid, or a mechanical arrangement such as ball bearings or wheels could be used. The ball 101 can be made to move using magnetic switches 131 that interact with magnetic points on the ball 101.

An LCD display 151 can be used to display an image 141 which can be the position of the planet Mars 411 in relation to constellation 421.

A moveable part 221 of the unit 391 can be arranged to move to an extended position to enable the unit 391 to stand unaided.

Figure 15:
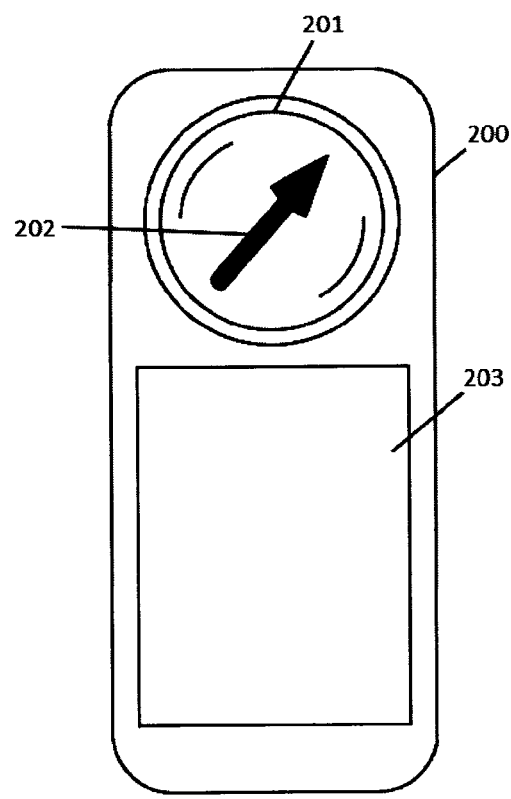
FIG. 15 is a diagram of a unit in accordance with yet another embodiment.

FIG. 15 illustrates an alternative portable unit 200 in which a ball 201 having a fixed arrow 202 therein is held within the unit 200 to enable it to be rotated to point in a direction selected using the display 203.

FIGS. 16 and 17 illustrate an alternative hand held arrangement in which the ball 1000 having a fixed arrow 1002 extends from the top of the unit 1001. The ball can be rotated relative to the unit 1002 in any direction in 3D. The unit 1002 is provided with a user interface 360 in the form of a touch screen.

Figure 18:
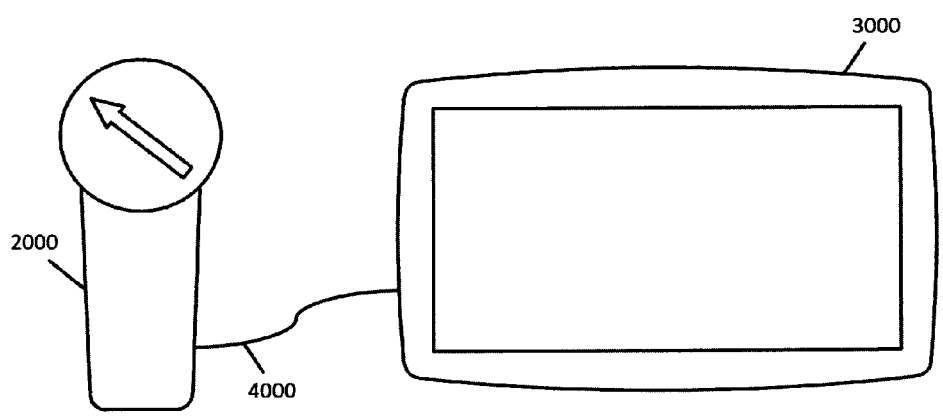
FIG. 18 is a diagram of a unit for use with a Sat Nav device in accordance with another embodiment.

FIG. 18 illustrates another embodiment of the present invention, in which the unit 2000 is connected to a Sat Nav device 3000. The connection may be a wire 4000 or by a wireless connection.

Figure 19:
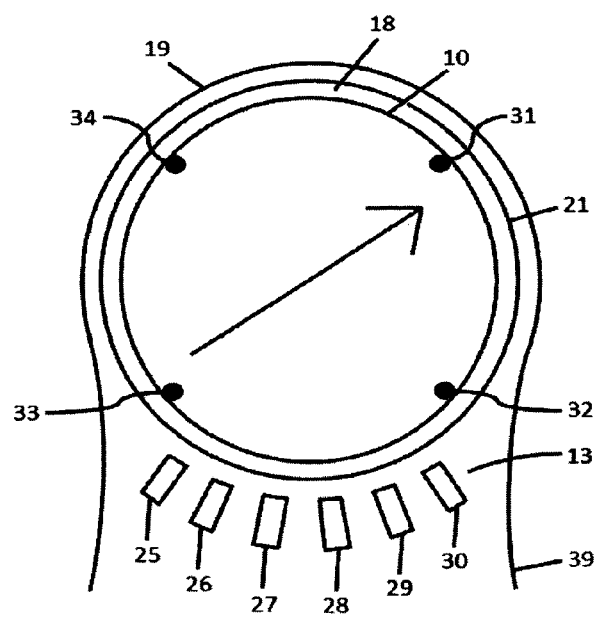
Figure 19:
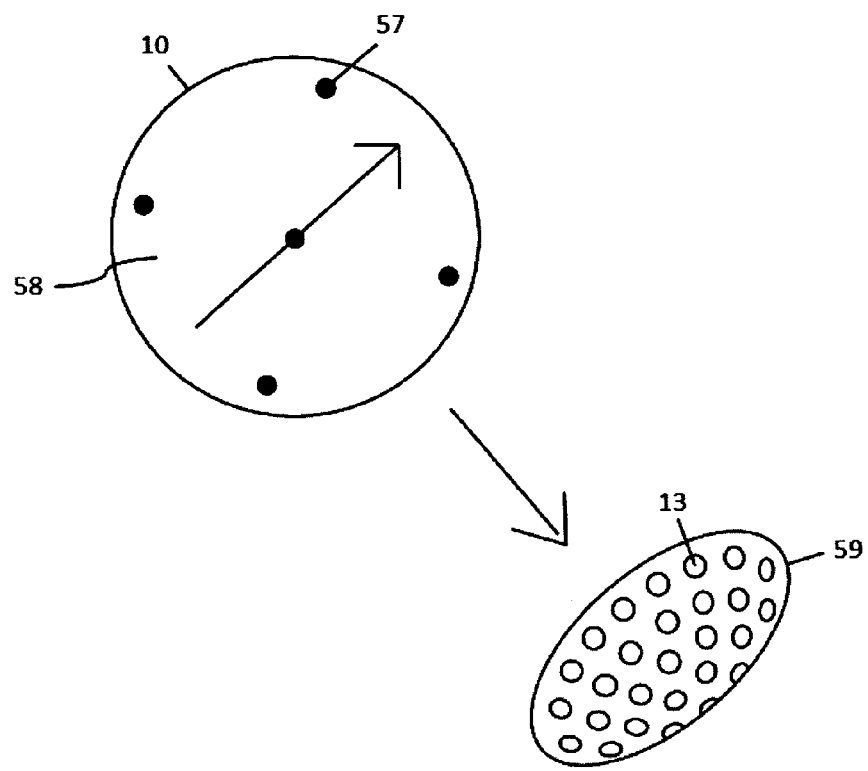

FIG. 19 (*a*) illustrates an actuator arrangement for driving the ball in accordance with one embodiment of the present invention, in which 31 to 34 are metal (or other magnetically attractable) points positioned around the circumference of the ball and level with its surface. Magnetic switches 25 to 30 are activated in a sequence that moves the ball in a required direction (a single line of magnetic switches is given here to illustrate the principle).

Switch 25 is thus switched on to attract point 33. When point 33 is over switch 25, switch 25 is switched off and switch 26 is switched on. Point 33 is then attracted to switch 26 which causes the ball to move so that point 33 is over switch 26. The sequence continues until point 33 is over switch 30 at which point 34 comes into the range of switch 25. Switch 30 is then switched off and switch 25 is switched on again, pulling point 34 (and therefore the ball) and the sequence continues in this manner until the ball arrives at the required position.

As shown in FIG. 19 (*b*) the ball 10 can be turned in any direction because it has metal points 57 distributed around the surface 58 of the ball and the magnetic switches 13 are housed within a concave area 59 adjacent to the ball that enables a sequence of them to be activated in any direction.

A method of sensing the position of the ball is incorporated to enable the computer to know the ball's position and thus make the calculations necessary for moving it as required. The metal points 57 around the circumference of the ball may be magnetised to different degrees, enabling the computer to know the position of the ball by measuring the magnetic power of each metal point as it comes within range of the sensor or sensors. The ball may have other features such as indentations or marks that can be read by laser for example to enable the computer to know the ball's position.

FIG. 20 illustrates an embodiment of the invention in which ball 10 rests on three wheels 23 and can be touched or lifted off unit 39. Each wheel can freely pivot around point 24 to enable it to change direction simultaneously with the ball, thus enabling the ball to move freely in any direction.

FIG. 21 illustrates a perspective view of the ball 10 with interior lines 36, 37 and 38 that extend across the internal radius of the ball. The lines are at a 90° angle to one another. Line 38 represents vertical. Lines 36 and 37 represent horizontal in both planes respectively. Mark 44 which may be coloured blue represents top of vertical line 38. Mark 43 which may be coloured red may represent forward direction or a direction such as north. (The different colours are to distinguish between top and forward direction).

The ball in this example may be used in an aircraft to provide an easy visual reference showing the horizon in both planes (lines 36 and 37) and north or another programmed direction (line 36 with mark 43) and also a line showing vertical (line 38) and which way is up (mark 44) from any angle of tilt of the aircraft.

The ball 10 in an embodiment of the invention may be operated using principles of a tracking ball or the ball of the computer mouse. In this event the ball is moved using motorised rollers positioned in a manner that resembles the rollers in the mouse.

Another arrangement by which the ball 10 can be driven to rotate is illustrated in FIGS. 22 and 23 in which the ball 10 is positioned adjacently to the roller 11. Note that in FIG. 22 the roller 11 is in contact with ball 10 and in FIG. 23 the roller 11 is not touching the ball 10.

The rotation of the roller 10 about axis 12 and swivel action about axis 13 is controlled by stepper motor 14 which responds to a computer program.

Arm position controller mechanism 15 causes arm 16 to occupy one of two positions—either 17 or 18. Note that in FIG. 22, arm 16 is in position 17 and in FIG. 23, arm is in position 18.

Arm 16 contains collar 19 that allows rod 20 to rotate freely within it. Arm 16 also contains collar 21 allowing rod 22 to rotate within it. Rod 22 is connected to cable 23 and rod 22 is also connected to cogwheel 24 which engages with cogwheels 25. Cogwheel 25 is supported by rod 26 that is caused to rotate by the stepper motor 14. Rod 20 supports cog housing 27. (See FIG. 22*a* which shows interior of cogwheel housing 27 that can receive cogwheel 25 in cogs 30).

Thus, the roller 11 causes ball 10 to turn in one direction to a required position by stepper motor 14 through rotation of cogwheel 25 which in turn rotates cogwheel 24 resulting in rod 22 and cable 23 rotating accordingly and causing roller 11 to rotate and thus the ball 10 to rotate.

In this instance rod 20 does not rotate because rod 29 (which is attached to the interior of rod 26) moves freely within it.

When a new direction for the roller is required, a computer program causes arm position controller mechanism 15 to move arm 16 from position 17 to 18 causing upper assembly of connected parts which include roller 11, rod 20, cog wheel 24, cog wheel housing 27 to move in the direction of the stepper motor 14, thus causing cogwheel 25 to become engaged within cog housing 27 with the result that the stepper motor can now cause the roller to change direction around axis 13. During this phase, roller 11 does not rotate about axis 12 because arm position controller mechanism 15 has caused cogwheel 24 to disengage from cogwheel 25. When the stepper motor 14 has moved the roller around axis 13 to the required position, the computer signals arm position controller mechanism 15 to cause arm 16 to return to position 17 whereupon the roller 11 makes contact with ball 10 again with the result that ball 10 can be moved in the new direction. By causing the stepper motor 14 and the arm position controller mechanism 15 to operate in this way, the computer program can cause the roller 11 to turn the ball 10 to any position.

The computer also detects the position of the ball 10 through one or more sensors indicated by 31, 32, 33 and 34 from patterns on the surface of the ball 10. The computer may check the position of the ball periodically and adjust it as required to correct any divergence between the roller 11 and the ball 10. The surface of the ball may be covered with shapes, patterns or other markings that can be "seen through" enabling the arrow or pointer within the ball to remain clearly visible to the user. The pattern, shape or markings can for example take the form of a dot matrix on the surface of the ball 10 in which you can see between the dots or the ink that is used for the patterns can be invisible to the naked eye but detectable in the ultraviolet end of the spectrum with the sensors 31 to 34 sensitive to ultraviolet.

Apart from the roller 11 that turns the ball 10, the ball may be supported in other ways, e.g. by other passive rollers distributed around the ball as required.

Another arrangement by which the ball can be operated would be by means of a spherical stepper motor in which the ball is the sphere in the motor.

FIG. 24 illustrates an arrangement in which ball 10 comprising hollow transparent sphere 40 in which an arrow 41 is fixed on the interior surface 42 between points 43 and 44. The ball 10 is suspended in a layer of liquid 45 between the ball 10 and the transparent spherical outer cover 46. Situated at the base of the ball is a cradle of magnetic switches some of which are represented by switches 47 to 51. Sensors represented by 52 and 53 detect the position of the ball 10 from a pattern or markings on the surface.

Connected to and situated around the ball are magnetic points, four of which are indicated by 54 to 57.

Magnetic switches that include 47 to 51 are activated in a series to pull the ball round by magnetic points 54 to 57 in accordance with a computer program, thereby turning the ball 10 and thus the arrow 12 to point in required directions.

Sensors 52 and 53 detect the position of the ball 10 enabling the computer to know the position of the ball and to adjust it accordingly.

The unit knows its position (including its angular orientation) in space and time through GPS and/or coordinates and has access to data through wireless connection to a PC and the interne on the position of places on earth and of the earth in space and of the position in space of celestial objects such as stars, planets and satellites and thereby can turn the ball to point at objects and places on earth and space from this data.

The unit may function in a dual capacity in the sense that the data it processes on the position of objects and places can be used separately with respect to the body of the unit and the ball—i.e. the body of the unit and ball may be involved in separate directions. The unit can thus provide an image on the screen that corresponds to the direction of the arrow in the ball or alternatively the image on the screen corresponds to the direction the unit is facing whilst the ball is pointing in a different direction, according to which of these two modes is selected by the user.

Another system by which the sphere can be operated would be by means of a spherical stepped motor illustrated in FIG. 26 in which the transparent sphere 10 contains an array of electromagnetic switches, one of which is 11, distributed around the circumference of sphere 10. The arrow 12 contains a magnetic or magnetically attractable material positioned at the front 13 or back 14 of the arrow or at both front 13 and back 14 positions.

Electromagnetic switches, one of which is 11, are positioned around the circumferences of the sphere 10. The electromagnetic switches 11 are activated in a series through a computer program in order to cause the arrow 12 to point in a required direction by pulling it around from one switch 11 to the next in a series by the magnetised or magnetically attractable sections 13, 14 on the arrow. Midway points for the arrow between electromagnetic switches can be achieved by activating adjacent electromagnetic switches at the same time to varying degrees of magnetism.

FIG. 26 illustrates another arrangement in which transparent sphere 10 contains electromagnetic switches 11 distributed around the circumference of the sphere. Each electromagnetic switch contains a magnetic core so that when the switch is not subject to a current the core is still magnetic. The arrow is suspended in the centre of the sphere because the magnetic sections 13 to 14 on the arrow have an opposite magnetic polarisation to the magnets 11 around the circumference of the sphere—i.e. circumference magnets have a north pole pointing in to the centre of the sphere and the magnetic sections 13 to 14 of the arrow have a north pole pointing away from the centre of the sphere. The arrow is thus pushed to a suspended position in the centre of the sphere through the repelling effect of magnetised points 13 to 14 against the magnets 11 in the substrate of the sphere.

The relationship between magnets, one of which is 11, and magnetic points at either end of the arrow 13 to 14 can be such that the magnetic effect is equal all around the sphere with respect to the arrow so that it can come to rest pointing in any direction.

The electromagnetic switches are activated to change the magnetism in specific areas in a series to move the arrow. Thus electromagnetic switches 11 and 15 may be switched to cause the arrow line up with 11 and 15.

A sensor 16 may be incorporated at the base of the sphere that can distinguish between the two end points 13 and 14 of the arrow when the arrow passes the sensor.

When the system is turned on after having been turned off, the system can for example switch electromagnets 17 and 18 to cause the arrow to line up with 17 and 18. This means that one end of the arrow is facing the sensor and the sensor detects which end of the arrow that is and this informs the computer as to which way the arrow is pointing, enabling the computer to point the arrow correctly.

The sphere may be made with two flat sections of transparent plastic that includes wiring and electromagnetic switches. The two flat plastic sections are then heated to a point at which they become malleable and they are then formed into two hemispheres by a spherical mould. When the material has cooled and become rigid, the two hemispheres are joined together to form a complete sphere.

The spheres may contain another object that is suspended in the sphere by the same principles. The sphere may contain a vacuum to remove air resistance.

FIG. 27 illustrates an alternative embodiment for driving an arrow 12 to rotate in 3D in a transparent sphere 10. The arrow 12 is made of lightweight material with two magnetic points positioned at either end 13 and 14. Brush piles 15 and 16 may be attached to the arrow 12 to aid stabilisation and reduce friction.

A bank of electromagnetic switches, seven of which are shown (17 to 23), are positioned at the base of the sphere 10. The electromagnetic switches interact with magnetic points 13 and 14 of the arrow 12. It is established which combination of switches pertain to each position of the arrow 12 eg 360° pointing angle. This pointing unit can be used with the apparatus of FIG. 8, 9 or 10.

Although the present invention has been described with reference to specific embodiments, it will be apparent to a skilled person that modifications lie within the spirit and scope of the present invention.

The invention claimed is:

1. A device for providing a true three dimensional representation of a direction or axis in three dimensions to a user, the device comprising:
   an indicator member that comprises or includes a linear indicator configured to indicate to the user a true three dimensional representation of a direction in or axis along any three dimensional direction,
   a static member for mounting the indicator member; and
   an actuator arrangement configured to urge the indicator member to rotate relative to the static member in any angle in three dimensions about a single point of rotational symmetry, wherein the axis or direction passes through the single point.

2. A device according to claim 1, wherein the indicator member comprises a substantially transparent sphere having a surface with the linear indicator fixed therein extending through the single point, and the actuator arrangement is configured to interact with the surface of the sphere to rotate the sphere relative to the static member.

3. A device according to claim 2, wherein the actuator arrangement comprises a mechanical drive arrangement for engaging with and urging the indicator member to rotate.

4. A device according to claim 1, wherein the indicator member comprises a linear indicator extending through the single point, the static member comprises a substantially transparent sphere having a centre and a circumference for containing the linear indicator so that the linear indicator is constrained to rotate about the single point located at the centre of the sphere, and the actuator arrangement is configured to generate an electromagnetic field, and the linear indicator is adapted to respond to changes in the electromagnetic field to rotate about the single point.

5. A device according to claim 2, wherein the actuator arrangement is configured to generate an electro-magnetic field and the indicator member includes a magnetic arrangement to respond to changes in the electro-magnetic field to rotate.

6. A device according to claims 2 and 4, including a position sensor arrangement for sensing the relative position of the indicator member and the static member, and the actuator arrangement is configured to be responsive to the sensed relative position.

7. A device according to any one of claims 2, 3, 4, and 5 including an attitude determination unit configured to determine the attitude of the static member and to control the actuator arrangement to cause the indicator member to act as an attitude indicator.

8. A device according to claim 4 wherein the actuator arrangement is configured to generate an electro-magnetic field utilizing an arrangement of coils positioned around the circumference of the sphere, and the linear indicator is adapted to respond to changes in the electro-magnetic field caused by the arrangement of coils to rotate about the single point.

9. A device according to claim 4 wherein the sphere is adapted to include a touch-screen capability, and the actuator arrangement moves the linear indicator in response to a position of a user's finger on the sphere.

10. A device according to any one of claims 2, 3, 4, 5, and 8 including an orientation determination arrangement configured to determine an orientation of the device in three dimensions wherein a processor is programmed to calculate an angle for the indicator member using the determined orientation.

11. A device according to claim 4, wherein the device is connected to a vehicle to indicate a three dimensional direction or axis along a three dimensional direction relative to an orientation of the vehicle in three dimensions.

12. A device according to claim 4, wherein the device is connected to a mobile unit to indicate a three dimensional direction or axis along a three dimensional direction relative to an orientation of the mobile unit in three dimensions.

13. A device according to claim 4, wherein the device is used as a three dimensional directional sign for use in public areas.

14. A direction indicating arrangement comprising:
    a processor programmed to calculate an angle in three dimensions for a true three dimensional representation of a direction;
    a pointing device for pointing in the direction in three dimensions; and
    a drive arrangement for driving the pointing device in response to the calculated angle to point in the direction,
    wherein the processor is programmed to use information on a target location and information on a current location of the pointing device, and to calculate the angle based on the information on the target location and the information on the current location of the pointing device.

15. A direction indicating arrangement according to claim 14, including a location determining arrangement for determining the current location of the pointing device in three dimensions.

16. A direction indicating arrangement according to claim 15, including an orientation determining arrangement configured to determine the orientation of the pointing device in three dimensions, wherein the processor is programmed to calculate the angle using the determined orientation.

17. A direction indicating arrangement according to claim 14, wherein the pointing device is static and the processor is programmed to use a known current location.

18. A direction indicating arrangement according to claim 17, wherein the processor is programmed to calculate the angle based on an assumed orientation of the pointing device.

19. A direction indicating arrangement according to claim 14, wherein the pointing device comprises the device of any one of claims 2, 3, 4, 5 and 8.

20. Apparatus according to any one of claims 14, 15, and 17, including a user interface configured to allow a user to select information for display on the direction.

21. A direction indicating arrangement according to any one of claims 14, 15, and 17, including a user interface configured to allow a user to input target location information, or to select a location from a list of locations, and the processor is programmed to respond to the input to calculate the target location.

22. Apparatus for providing information on a location in a direction, the apparatus comprising:

a pointing device comprising a mount and a direction indicator moveable by a user relative to the mount to point in a direction in three dimensions;

a detection arrangement for detecting an orientation of the direction indicator in three dimensions relative to the mount;

a processor programmed to determine the direction and information on the direction using the detected orientation; and a display for displaying information on the direction.

23. Apparatus according to claim 22, wherein the processor is programmed to use information on a current location of the pointing device to determine the direction.

24. Apparatus according to claim 23, wherein the pointing device is static and the processor is programmed to use a known current location.

25. Apparatus according to claim 14, wherein the processor is programmed to calculate the direction using an assumed orientation of the pointing device.

26. Apparatus according to claim 22, including a location determining arrangement for determining a current location of the pointing device in three dimensions, and the processor is programmed to use the determined current location in the determination of the direction.

27. Apparatus according to claim 26, including an orientation determining arrangement configured to determine the orientation of the pointing device in three dimensions, wherein the processor is programmed to use the determined orientation in the determination of the direction.

28. Apparatus according to claim 22, wherein the pointing device comprises the device of any one of claims 2, 3, 4, 5, and 8.

* * * * *